Patented Aug. 12, 1952

2,606,858

UNITED STATES PATENT OFFICE 2,606,858

THERMALLY VAPORIZABLE PESTICIDE

John Gillies and William Thomas Cunningham, Saltcoats, Scotland, assignors to Imperial Chemical Industries Limited, a corporation of Great Britain No Drawing. Application June 11, 1948, Serial No. 32,527. In Great Britain July 18, 1947

1 Claim. (Cl. 167—40)

The present invention relates to compositions for vaporising and disseminating pest combating compounds, and is particularly concerned with the provision of such compositions which include thermally vaporisable liquid compounds lethal or repellant to animal, vegetable, bacterial, fungoid or virus, the animal pests including for instance, insects, spiders, beetles and the like.

Recently there have been introduced fumigating compositions consisting essentially of mixtures of a thermally vaporisable pesticidal compound with a suitable solid composition capable of undergoing a self-sustained gas-evolving exothermic non-detonating decomposition when a portion of mass of the composition is heated, the heat and gases from which serve to vaporise and disseminate the pesticide. Hitherto, however, it has only been practicable to employ in this way pesticidal compounds that are solid at ordinary atmospheric temperatures, since in the case of normally liquid compounds of this nature in general only a very small proportion can be retained by the solids capable of said self-sustaining decomposition, without exuding from them. It will be understood that if only a small percentage of a vaporisable compound is present in association with the solid ingredients adapted to undergo self-sustaining exothermic gas evolving non-detonating decomposition, the amount of latent heat absorbed in vaporising the vaporisable compound will be correspondingly small; and that except in the case of compositions based on ingredients capable of undergoing such exothermic decompositions at exceptionally low temperatures, the vaporisable compound may accordingly undergo severe thermal decompositions. Thus the presence of a substantial percentage of a vaporisable organic compound in the composition may be necessary to reduce the reaction temperature sufficiently to prevent the compound being largely decomposed into useless products, quite apart from the obvious consideration that it is desirable on economic grounds that the proportion of the vaporisable compound in the composition should be as high as can efficiently be vaporised from it.

According to the present invention a composition for vaporising and disseminating a thermally vaporisable liquid compound of pest combating characteristics consists of a mixture comprising at least one solid compound propagating throughout itself at ordinary atmospheric pressures a self-sustained gas-evolving exothermic non-detonating decomposition when initiated by local heating, a liquid thermally vaporisable compound of pest combating characteristics and a solid carrier for said liquid.

For such solid compound capable of propagating throughout itself at ordinary atmospheric pressure a self-sustained gas-evolving exothermic non-detonating decomposition when initiated by local heating which requires a sensitiser before such decomposition can be effected the composition according to the invention includes a sufficient quantity of such sensitiser to permit said decomposition to take place in the presence of the said liquid and said solid carrier.

It is to be understood that the said solid carrier is present at least in amount sufficient to prevent any exudation of the liquid from the composition.

In accordance with one form of the invention the solid carrier is a solid inorganic or organic material of porous structure on which the liquid has no solvent effect, for instance kieselguhr, low density wood flour, charcoal, silica gel or the like.

In accordance with another form of the invention the solid carrier is an organic colloid on which the liquid has a solvent effect, and which in relatively small quantities can thicken the liquid to such a degree that the colloid can hold a substantial quantity of liquid without forming a composition so fluid as to flow under small stresses. In accordance with this form of the invention the solid compound or compounds capable of self-sustaining exothermic decomposition may conveniently be distributed through the resulting plasticised colloid by mechanical working provided that the latter becomes workable at a temperature substantially below that at which the decomposition of the ingredients of the said solid compound or compounds can be initiated. Alternatively, the distribution of the said compound or compounds may be accomplished with the aid of a solvent for the colloid that is volatile at ordinary temperatures, which is subsequently evaporated off. Compositions in accordance with this form of the invention may be fashioned into rods or the like by extrusion. Organic colloids for the purpose may include for instance cellulose esters, cellulose ethers, polymerized unsaturated compounds, proteins, gums and the like depending on the nature of the liquid pest control compound.

For combinations of solid compound capable of propagating throughout itself at ordinary atmospheric pressures a self-sustained gas-evolving exothermic non-detonating decomposition when initiated by local heating which requires a sensitiser before such thermal decomposition can be effected and said sensitiser it is preferred to have those which yield little ash and are capable in the undiluted state of yielding decomposition products at temperatures not exceeding about 1,000° C.

Compositions based on mixtures of ammonium nitrate and a chromium compound capable of sensitising the self-sustaining exothermic gas-evolving non-detonating decomposition of ammonium nitrate are specially suitable, since their decomposition is flameless and is easily initiated, while the temperatures produced by the decomposition of these mixtures are very moderate; but compositions based on compounds or mixtures producing somewhat higher temperatures, preferably without the appearance of a flame, may also be used, for instance compositions based on the decomposition of ammonium dichromate; or based on the decomposition of guanidine nitrate and/or nitroguanidine mixtures with various solid decomposition sensitising agents as proposed in copending British application No. 24,123/46.

Examples of liquid thermally vaporisable compounds of pest combating characteristics are: "Thanite," orthodichlorobenzene, hexaethyl tetraphosphate, "E605," dimethylphthalate.

Compositions according to the invention and the process for their production are further illustrated by the following examples in which the parts are parts by weight.

Example I

This composition includes a liquid insecticide known as "Thanite," which to the extent of about 85% is isobornyl-thiocyano-acetate.

|  | Per cent |
|---|---|
| Balsa wood flour | 33 |
| "Thanite" | 17 |
| Ammonium nitrate | 25 |
| Ammonium dichromate | 18.3 |
| Potassium dichromate | 2.5 |
| Cuprous chloride | 4.2 |

The solid ingredients are all fine enough to pass a 25 mesh B. S. S. screen.

The "Thanite" is first absorbed into the balsa wood flour, and the resulting loose product and the rest of the ingredients are mixed mechanically together and pressed into the form of a cake at a pressure of about 2 tons per sq. inch and wrapped in waxed paper composition. The resulting product, which in cake form is somewhat friable, volatilises and disperses the insecticide in a stream of steam, nitrogen and other gases without flame when the decomposition is initiated by local heating with the flame of a match for about 15 seconds. The fumes generated by the cake are effective against flies.

Example II

This composition includes both "Thanite" and the gamma isomer of hexachlorocyclohexane.

|  | Per cent |
|---|---|
| Kieselguhr | 16 |
| "Thanite" | 16 |
| Ammonium nitrate | 47 |
| Potassium chromate | 5 |
| Gamma isomer of hexachlorocyclohexane | 16 |

The "Thanite" is first absorbed into the kieselguhr and the resulting product and the rest of the ingredients, which are all solids, are mixed together and pressed into cake form in the fashion of the preceding example. The fumes generated by the decomposition of the cake disseminate both the "Thanite" and the gamma isomer of hexachlorocyclohexane. The "Thanite" has "knock-down" properties and is quicker in its action as a pesticide than the gamma isomer of hexachlorocyclohexane. On the other hand the toxicity of the "Thanite" in a deposit from these fumes is soon lost whereas the toxicity of the gamma isomer of hexachlorocyclohexane in such a deposit lasts for a long time.

Example III

|  | Per cent |
|---|---|
| Kieselguhr | 29.5 |
| "Thanite" | 20 |
| Ammonium nitrate | 25 |
| Ammonium dichromate | 18.3 |
| Potassium dichromate | 2.5 |
| Cuprous chloride | 4.2 |
| Asbestos | 0.5 |

The product is produced, pressed and packed in the manner indicated in the preceding examples.

Example IV

|  | Per cent |
|---|---|
| Nitrocellulose of 12% nitrogen content and viscosity 100–200 poises as measured at 20° C. in a concentration of 4 gm. per 100 c. c. aqeous acetone of 95% acetone content by volume | 2.7 |
| "Thanite" | 17.7 |
| Ammonium nitrate | 63.7 |
| Potassium chromate | 15.9 |

The nitrocellulose and the "Thanite" are worked together and the ammonium nitrate and potassium chromate are worked into resulting plastic at a temperature of about 60° C., and the resulting composition is then extruded under pressure into rod form. The decomposition of the rod can be initiated in the usual manner by the flame of a match.

Example V

This composition includes the liquid orthodichlorobenzene and in compressed form may be used for fumigating wood to protect it from the ravages of wood boring beetles.

|  | Per cent |
|---|---|
| Ortho-dichlorobenzene | 20 |
| Kieselguhr | 25 |
| Ammonium nitrate | 49.5 |
| Potassium chromate | 5.5 |

The ortho-dichlorobenzene is absorbed into the kieselguhr and the resulting product is mixed with the ammonium nitrate and potassium chromate and the mixture is pressed and packed as described in Example I.

Example VI

This composition includes tetrachloroethane a liquid useful in combating wood lice.

|  | Per cent |
|---|---|
| Tetrachloroethane | 20 |
| Kieselguhr | 20 |
| Ammonium nitrate | 54 |
| Potassium chromate | 6 |

The procedure in making, pressing and packing the composition is similar to that described in Example I.

Example VII

This composition includes the liquid insecticide hexaethyl tetraphosphate, useful for protecting apple trees from the attack of the apple blossom weevil.

| | Per cent |
|---|---|
| Hexaethyl tetraphosphate | 25 |
| Kieselguhr | 30 |
| Ammonium nitrate | 22.3 |
| Ammonium dichromate | 16.3 |
| Potassium dichromate | 2.1 |
| Cuprous chloride | 4.3 |

The procedure in making, pressing and packing the composition is similar to that described in Example I.

*Example VIII*

This composition includes hexaethyl tetraphosphate and nitrocellulose, hexaethyl tetraphosphate being a solvent for nitrocellulose.

| | Per cent |
|---|---|
| Nitrocellulose as used in Example IV | 4 |
| Hexaethyl tetraphosphate | 20 |
| Ammonium nitrate | 37.6 |
| Ammonium dichromate | 27.6 |
| Potassium dichromate | 3.6 |
| Cuprous chloride | 7.2 |

The manner in which the composition is made and converted into rod form is similar to that described in Example IV, and the decomposition of the rod can be initiated in the usual way by the flame of a match.

*Example IX*

A rod suitable for generating and disseminating the vapour of an insect repellant that can deposit in thin liquid film form on the walls bounding the space where the vapour is generated is made by substituting dimethyl-phthalate for the hexaethyl tetraphosphate in Example VIII, the procedure being otherwise identical.

*Example X*

This composition includes the liquid insecticide known as "E605."

| | Per cent |
|---|---|
| Ammonium nitrate | 77.4 |
| Potassium chromate | 8.6 |
| Kieselguhr | 7.0 |
| E605 | 7.0 |

The E605 included is stated to contain 75 per cent. para-nitro-o-phenyl diethyl thiophosphate, which is claimed to be the toxic compound.

The composition can be used as a loose powder. The loose powder volatilises and disperses the E605 in a stream of steam, nitrogen and the gases without flame when the decomposition is initiated by local heating with the flame of a match for about 15 seconds.

If such a quantity of the loose powder as contains 1 gram of E605 is initiated in a smoke cell of 1,000 cubic feet capacity and the deposit collected on glass plates for a period of two hours and *Tribolium castaneum* Hbst. and *Calandra granaria* L. are exposed on these plates for 1 hour, 100 per cent. and 92 per cent. kills respectively are obtained.

We claim:

A composition for vaporizing and disseminating a thermally vaporizable normally liquid compound of pest combating characteristics consisting of a mixture comprising a sensitized nitrogen base compound selected from the group consisting of ammonium nitrate, guanidine nitrate and nitroguanidine, a liquid thermally vaporizable pest combating compound, and a solid absorbent carrier for said liquid in an amount at least sufficient to prevent any exudation of the said liquid pest combating compound from said mixture, said solid absorbent carrier being kieselguhr.

JOHN GILLIES.
WILLIAM T. CUNNINGHAM.

REFERENCES CITED

The following references are of record in the file of this patent:

UNITED STATES PATENTS

| Number | Name | Date |
|---|---|---|
| 499,407 | Watson | June 13, 1893 |
| 1,459,036 | Reinhold | June 19, 1923 |
| 2,217,611 | Borglin | Oct. 8, 1940 |
| 2,409,111 | Davis | Oct. 8, 1946 |
| 2,440,082 | Flanders et al. | Apr. 20, 1948 |
| 2,532,349 | Taylor et al. | Dec. 5, 1950 |

FOREIGN PATENTS

| Number | Country | Date |
|---|---|---|
| 584,853 | Great Britain | Jan. 24, 1947 |

OTHER REFERENCES

Martin et al.: "Developments in Methods and Materials for the Control of Plant Pests and Diseases in Germany," page 22. B. I. O. S. Final Report Number 1095, Item Number 22. May to June 1946.